(12) United States Patent
Takashi et al.

(10) Patent No.: US 7,104,374 B2
(45) Date of Patent: Sep. 12, 2006

(54) POWER TRANSMISSION MECHANISM AND ELECTRIC DRIVE SYSTEM USING THE SAME

(75) Inventors: Nozaki Takashi, Osaka (JP); Yamagata Akira, Osaka (JP); Hakamata Hiroyuki, Osaka (JP); Hayama Yoshihiko, Osaka (JP)

(73) Assignee: NTN Corporation, Osaka (JP)

( * ) Notice: Subject to any disclaimer, the term of this patent is extended or adjusted under 35 U.S.C. 154(b) by 91 days.

(21) Appl. No.: 10/936,696

(22) Filed: Sep. 9, 2004

(65) Prior Publication Data

US 2005/0077137 A1  Apr. 14, 2005

(30) Foreign Application Priority Data

Sep. 10, 2003  (JP) ............................. 2003-318077
Oct. 10, 2003  (JP) ............................. 2003-352064

(51) Int. Cl.
*B60K 17/02* (2006.01)
*F16D 15/00* (2006.01)

(52) U.S. Cl. ........................... 192/35; 192/38; 192/50; 180/65.6

(58) Field of Classification Search .................. 192/50
See application file for complete search history.

(56) References Cited

U.S. PATENT DOCUMENTS 3,700,082 A * 10/1972 Schwab ....................... 192/50
4,434,878 A * 3/1984 Okubo ...................... 192/48.92
4,720,001 A * 1/1988 Jensen ...................... 192/13 R
6,409,000 B1 * 6/2002 Itoh et al. ...................... 192/39
2002/0170795 A1 * 11/2002 Yasui et al. ...................... 192/35

FOREIGN PATENT DOCUMENTS

| JP | 11-091389 A | 4/1999 |
| JP | 2000-326749 A | 11/2000 |
| JP | 2001-287550 A | 10/2001 |
| JP | 2003-032806 A | 1/2003 |

* cited by examiner

*Primary Examiner*—Richard M. Lorence
(74) *Attorney, Agent, or Firm*—Wenderoth, Lind & Ponack, L.L.P.

(57) ABSTRACT

A power transmission mechanism for a vehicle includes a clutch assembly which includes a two-way clutch and an electromagnetic clutch. The two-way clutch includes three rows of rollers retained by a retainer and disposed between a clutch inner member, which is actually a stem of a constant-velocity joint mounted on the outboard end of a drive axle, and a clutch outer member, which is actually a hub ring of a hub bearing supporting a vehicle wheel. Simply by energizing and deenergizing the electromagnet of the electromagnetic clutch, the two-way clutch can be engaged and disengaged. Since the rollers are arranged in three rows, it is possible to increase the contact area between the rollers and the clutch inner and outer members and thus the maximum torque that can be transmitted through the rollers without the need to increase the number of rollers in each row or their length or diameter.

35 Claims, 6 Drawing Sheets

POWER TRANSMISSION MECHANISM AND ELECTRIC DRIVE SYSTEM USING THE SAME

BACKGROUND OF THE INVENTION

This invention relates to a power transmission mechanism mounted on a vehicle for transmitting driving torque to a wheel of the vehicle, and an electric drive system including two such power transmission mechanisms for driving at least the front wheels or the rear wheels of a vehicle.

Because of their environment-friendliness, electric vehicles, which run on an electric motor alone, and hybrid cars, which use both a conventional internal combustion engine and an electric motor, are now being vigorously developed by many car manufacturers. Some of them are already hitting the market. The electric drive system of this type of vehicles has a power transmission mechanism in its drive train. Such a power transmission mechanism includes a clutch for selectively allowing and shutting off torque transmission between the driving motor and wheels to protect the motor against overloads from the wheels or prevent accidents due to runaway of the motor. Conventional such clutches include a dog clutch, which includes claws provided on the driving member and driven members and adapted to be meshed with each other, and a friction clutch, which includes friction surfaces provided on the driving and driven members and adapted to be brought into frictional contact with each other (see JP patent publications 11-91389 and 2001-287550 (both unexamined)).

When engaging a dog clutch, it is necessary to extremely accurately synchronize the rotations of the driving member and the driven member. Otherwise, the claws of the driving and driven members may fail to mesh with each other and/or shock may be produced when they are meshed with each other. Even if the claws are meshed with each other, they may be locked together due to torque resulting from friction in the motor. Once they are locked together, they may not easily separate from each other even when trials are made to disengage the clutch after the motor has been stopped.

A friction clutch is free of this problem. But it has another problem in that even when the clutch is disengaged, the driving member and the driven member cannot be completely separated from each other due to the presence of viscous fluid in the clutch. Thus, even when the clutch is disengaged, torque may be transmitted from the wheels to the motor, thus overloading the motor. Thus, such a clutch cannot sufficiently protect the motor.

Most of such conventional clutches are provided in the drive train between the motor and the power distribution mechanism. In a hybrid car, the electric motor and the engine are alternately or simultaneously used to drive the vehicle. When the vehicle is driven only by the engine, the above-mentioned clutch is disengaged to separate the electric motor from the wheels. But even in this state, the elements of the drive train between the clutch and the wheels are rigidly coupled to the wheels. Thus, the driving torque from the engine has to be used to drive not only the wheels but also these elements (torque needed to drive these elements is hereinafter referred to as drag torque). This worsens fuel economy. If the clutch is a friction clutch, since such a clutch cannot be completely disengaged as described above, the engine torque will have to be used to drive the motor, too. Also, in order to transmit a sufficiently large driving torque to the wheels from the motor, the friction clutch has to have a large number of friction disks. Such a friction clutch is inevitably large in size and heavy in weight, and thus further worsens fuel economy.

The applicant of this invention has proposed an improved clutch assembly to be used as the power transmission mechanism of the above-described type. This clutch assembly comprises a two-way clutch and an electromagnetic clutch. The two-way clutch includes a driving member having cam surfaces on the outer periphery thereof, a driven member fitted around the driving member and having a cylindrical surface on the inner periphery thereof, a plurality of rollers disposed between the cam surfaces and the cylindrical surfaces, and a retainer disposed between the driving member and the driven member for retaining the rollers. The rollers are capable of engaging both of the driving member and the driven member when the retainer rotates in either rotational direction relative to the driving member. The electromagnetic clutch includes an electromagnet which can be selectively energized and deenergized, and a rotor coupled to the driven member and adapted to be nonrotatably coupled to the retainer when the electromagnet is energized or deenergized (see JP patent publications 2000-326749 and 2003-32806 (both unexamined)).

If such a clutch assembly is provided in the drive train of a vehicle, its two-way clutch can be far more easily engaged and disengaged than a dog clutch, and also, unlike a friction clutch, the motor can be completely separated from wheels. Thus, this clutch assembly can reliably protect the motor. In applying it to a hybrid car, two such clutch assemblies are preferably mounted in the drive train, each near the hub bearing of one of front or rear wheels to minimize drag torque and thus improve fuel economy. If such clutch assemblies protrude from the outboard ends of the respective hub bearings, they will pose safety problems and ruin the appearance of the vehicle. If they protrude from the inboard ends of the hub bearings, they will interfere with driving members such as constant-velocity joints, thus restricting the freedom of design of these members. Thus, at least the two-way clutch of each clutch assembly is preferably mounted radially inside of the hub bearing.

But in order to mount the two-way clutch radially inside of the hub bearing, it is necessary to use small-diameter rollers. The contact area between such small-diameter rollers and the inner and outer members (driving and driven members) of the hub bearing is small. Thus, the maximum torque that can be transmitted through such small-diameter rollers is also small.

In order to increase the contact area and thus the maximum torque that can be transmitted through such small-diameter rollers, it is necessary to increase the number of rollers in each row, or increase the length of each roller. But if the number of rollers in each row is increased, the circumferential area where each roller is disengaged correspondingly shortens. This increases the possibility of malfunction of the clutch. Specifically, this increases the possibility of the rollers inadvertently engaging or disengaging when the retainer rotates even slightly relative to the driving member due to vibrations or shocks. Also, if the number of rollers in each row is increased, it is necessary to correspondingly increase the number of cam surfaces. This increases the cost for forming the cam surfaces and also makes it more difficult to form the cam surfaces. If longer rollers are used to increase the contact area, the rollers are more likely to inadvertently engage or disengage when the inner and outer members of the clutch deflect due e.g. to impulse loads that act on the wheel and as a result, the shape of the gap between the inner and outer members changes.

An object of the invention is to provide a power transmission mechanism including a clutch which can be easily engaged and disengaged, which can completely shut off transmission of torque between the driving member and the driven member, and which can tranmit sufficiently large torque.

SUMMARY OF THE INVENTION

According to this invention, there is provided a power transmission mechanism for a vehicle including a clutch assembly comprising a two-way clutch comprising a driving member adapted to be coupled to a drive axle of the vehicle, a driven member adapted to be fixed to a wheel of the vehicle, a plurality of rows of rollers disposed between the driving member and the driven member, and a retainer disposed between the driving member and the driven member for retaining the rollers, the rollers being capable of engaging both of the driving member and the driven member when the retainer rotates in either rotational direction relative to the driving member, and an electromagnetic clutch comprising an electromagnet which can be selectively energized and deenergized, and a rotor coupled to the driven member and adapted to be nonrotatably coupled to the retainer when the electromagnet is energized or deenergized, whereby driving torque can be transmitted from the drive axle to the wheel through the two-way clutch by energizing or deenergizing the electromagnet.

The two-way clutch can be easily engaged and disengaged simply by energizing and deenergizing the electromagnet of the electromagnetic clutch. The two-way clutch can completely shut off transmission of torque between the driving member and the driven member when it is disengaged. Since the rollers are provided in a plurality of rows, the contact area between the rollers and the inner and outer members of the clutch increases and thus the maximum torque that can be transmitted through the rollers increases without the need to change the dimensions of each roller or the number of rollers in each row.

Since the rollers of the two-way clutch of the clutch assembly are arranged in a plurality of rows, maximum torque that can be transmitted through the rollers can be increased without changing (i.e. increasing) the number of rollers in each row or their dimensions (particularly their length and diameter). This makes it possible to mount the two-way clutch radially inside of the hub clutch while keeping sufficient maximum torque that can be transmitted through the rollers.

Preferably, the retainer comprises a plurality of retainer elements each retaining one of the plurality of rows of rollers, the retainer elements being joined together through an elastic member having a lower rigidity than the retainer elements. With this arrangement, even if the rollers in the respective rows are not engaged simultaneously and as a result, the retainer is subjected to torsional stresses, the elastic members will absorb such torsional stresses in such a way that such torsional stresses will not locally concentrate. This prolongs the life of the retainer and thus prevents trouble of the clutch assembly resulting from failure of the retainer.

If the retainer elements are made of a metal, the elastic member may be made of an organic compound, which can be freely selected from among a vast variety of organic compounds.

The retainer elements may be made of a plastic. In this case too, the elastic member has to be formed of a material lower in rigidity than the plastic forming the retainer elements. Generally speaking, plastics are less expensive than metals. Thus, retainer elements made of plastics would be cheaper than metallic retainer elements.

In one embodiment of the invention, the retainer elements have side edges facing each other, the side edges being bent radially inwardly and bonded to each other through the elastic member. In another embodiment, the retainer elements have side edges facing each other, and protrusions and recesses are formed along each of the side edges, the protrusions formed along each of the side edges being engaged in the recesses formed along the opposed side edge, with the elastic member filling a gap present between the side edges. The bent portions increase the rigidity of the individual retainer elements and thus the entire retainer, and also increase the bond area between the retainer elements and the elastic member and thus the bond strength therebetween. This also contributes to increased rigidity of the retainer.

Preferably, the gap has axial portions defined by axial walls of the protrusions and the recesses and circumferential portions defined by circumferential walls of the protrusions and the recesses. With this arrangement, the bending rigidity and the torsional rigidity of the retainer can be determined separately from each other by separately adjusting the widths of the axial portions and the circumferential portions of the gap and thereby separately adjusting the thicknesses of the portions of the elastic member filling the axial portions and the circumferential portions of the gap. For example, it is possible to increase only the torsional rigidity of the retainer. It is also possible to prevent peeling of the elastic member.

The elastic member may be made of an anisotropic material so that the bending rigidity and the torsional rigidity of the retainer can be determined separately from each other.

Thus, the torsional rigidity and the bending rigidity of the retainer can be separately determined according to the deflection characteristics of the hub bearing and/or the torsional characteristics of the joint stem.

The retainer elements have windows each receiving one of the rollers. The windows are preferably formed after joining the retainer elements together. With this arrangement, the windows can be positioned accurately such that the rollers can engage and disengage in a stable manner.

From another aspect of the invention, there is provided an electric drive system for a vehicle, comprising an electric motor, a pair of wheels, and a drive train for transmitting driving torque produced by the electric motor to the wheels, the drive train comprising a speed reducer connected to the electric motor, a power distribution mechanism connected to the speed reducer, drive axles connected to the power distribution mechanism, two of the power transmission mechanism as mentioned above, each coupled to one of the drive axles, and hub bearings each connected to one of the drive axles through the power transmission mechanism and coupled to one of the wheels.

This system can reliably protect the motor, minimize drag torque when the clutch is disengaged, and thus improve fuel economy if mounted on a hybrid car.

The power distribution mechanism may have a function of rotating the drive axles at the same speed, or may have a function of delivering equal driving torques to the drive axles. That is, it may or may not have a differential function. If it has no differential function, the two clutch assemblies can be used as a differential by separately controlling them. Since the power distribution mechanism has no differential function, it is lightweight, so that the entire system is also lightweight. But the power distribution mechanism may have a differential function. In this case, it is not necessary to control the two clutch assemblies separately from each other. Thus, they can be controlled easily.

Each of the power transmission mechanism is preferably integral with the corresponding hub bearing. This minimizes the size and weight of the entire system.

BRIEF DESCRIPTION OF THE DRAWINGS

Other features and objects of the present invention will become apparent from the following description made with reference to the accompanying drawings, in which.

DETAILED DESCRIPTION OF THE INVENTION

Now referring to FIGS. 1–7, the electric drive system embodying the present invention will be described below. This drive system is mounted on what is known as a hybrid car to drive either its front or rear wheels, and includes an electric motor 1 and a drive train. The driving torque produced by the electric motor 1 is transmitted to right and left wheels 6 through the drive train, which comprises a speed reducer 2, a power distribution mechanism 3, drive axles 4, and power transmission mechanisms in hub clutch units 5.

Figure 1:
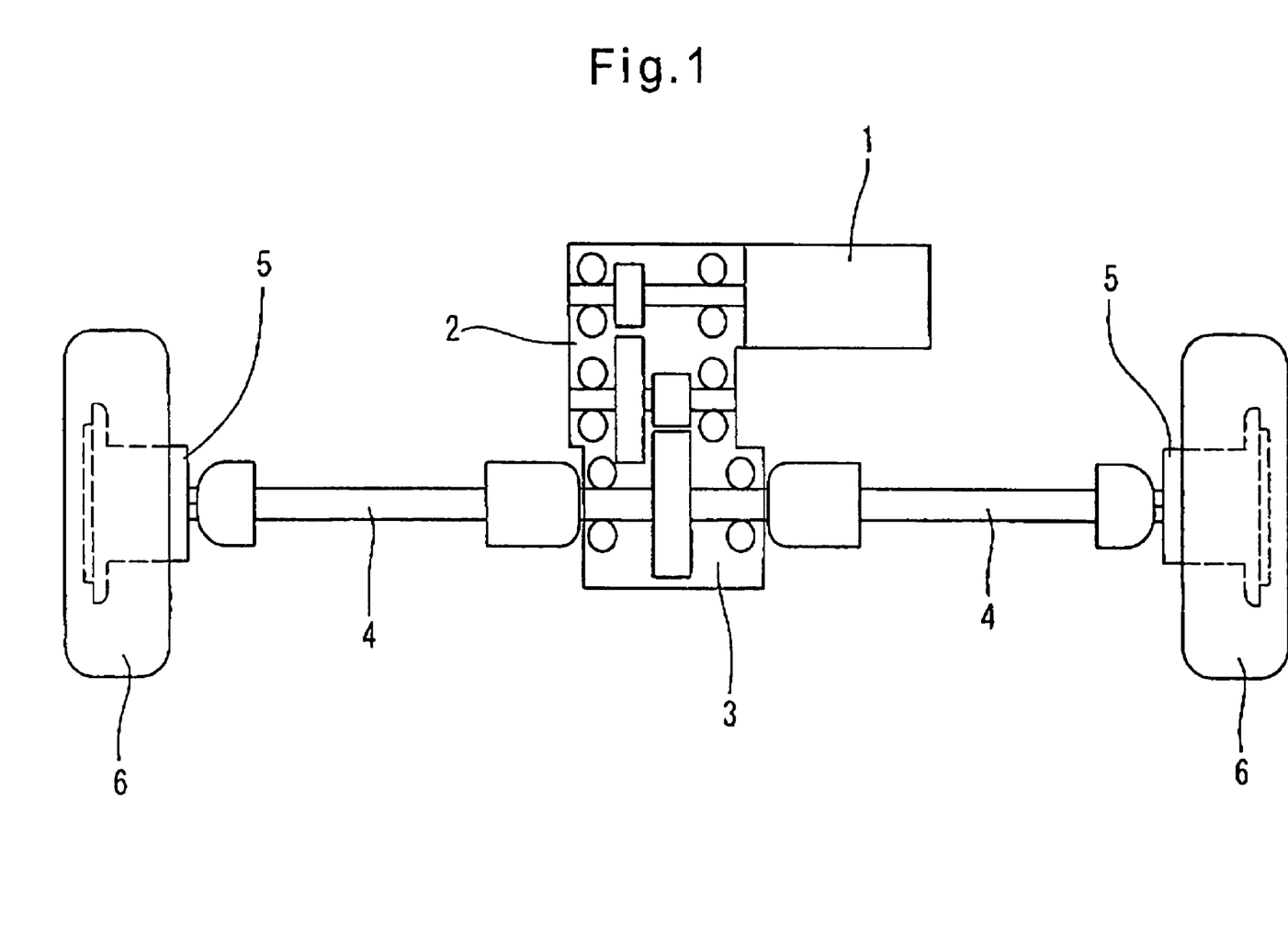
FIG. 1 is a schematic view of the electric drive system embodying the present invention.

The electric motor 1 is a DC motor including a permanent magnet. Its output (rotation) is reduced in speed by the speed reducer 2 and delivered to the right and left drive axles 4 through the power distribution mechanism 3. The outputs of the respective drive axles 4 are delivered to the respective wheels 6 through the respective hub clutch units 5. The wheels 6 thus rotate at the same speed as long as the hub clutch units 5 are both engaged.

Figure 2:
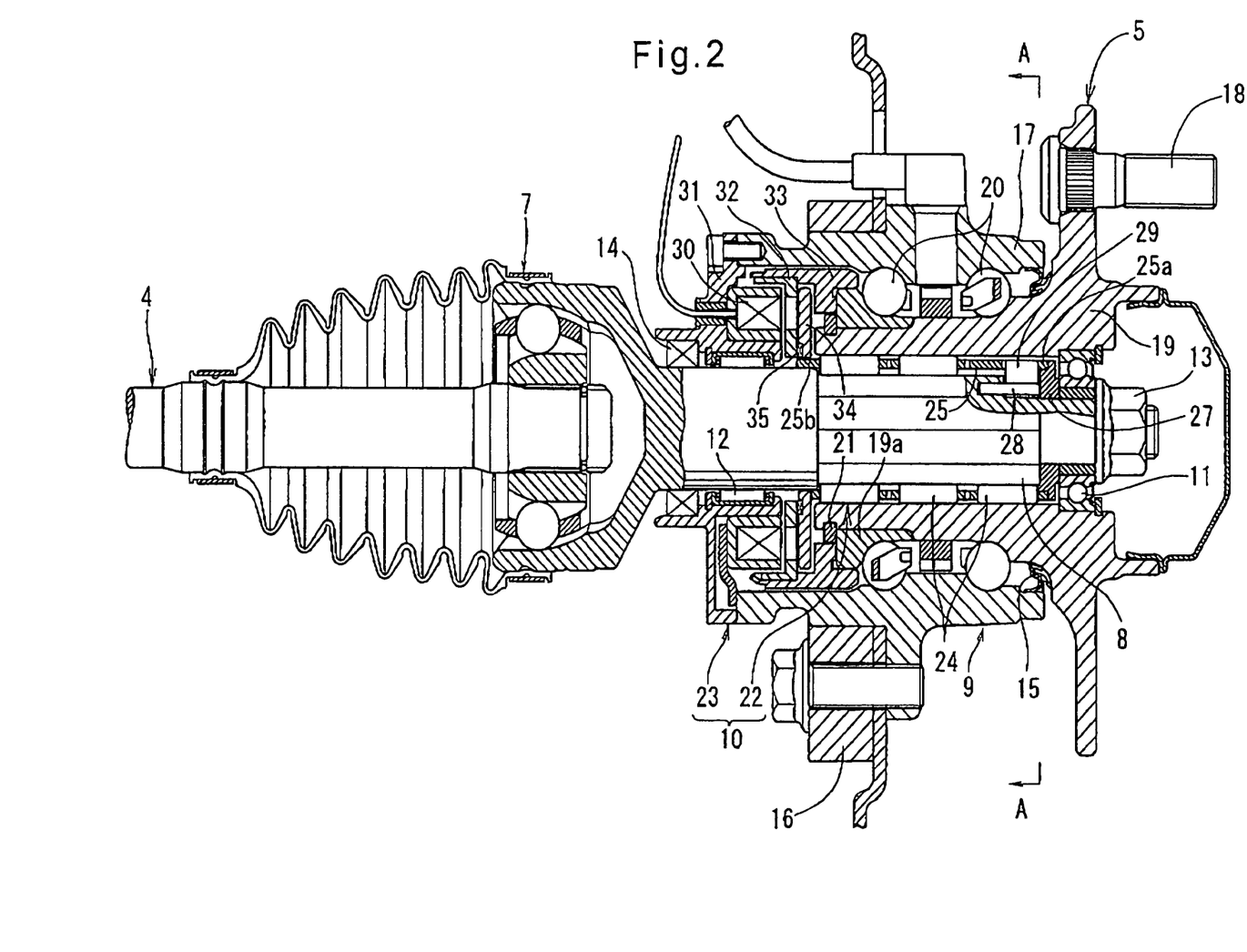
FIG. 2 is a front view in longitudinal section of the drive system of FIG. 1.

As shown in FIG. 2, a constant-velocity joint 7 is mounted on the outboard end of each drive axle 4. Each hub clutch unit 5 is mounted on a stem 8 of the constant velocity joint 7, and constitutes the power transmission mechanism, which comprises a hub bearing 9 rotatably supporting the wheel 6, and a clutch assembly 10 for selectively coupling and uncoupling the drive axle 4 to and from the wheel 6. A ball bearing 11 and a needle roller bearing 12 are disposed between the stem 8 and the hub clutch unit 5 to allow relative rotation therebetween when the clutch assembly 10 is not engaged. The ball bearing 11 cooperates with a locking nut 13 provided at the outboard end of the stem 8 to prevent axial movement of the stem 8. The hub bearing 9 and the clutch assembly 10 have seals 14 and 15, respectively, which prevent entry of foreign matter into the hub clutch unit 5 and leak of lubricant in the unit 5.

The hub bearing 9 comprises an outer ring 17 fixed to a knuckle 16, which is a part of the vehicle suspension, a hub ring 19 inserted in the outer ring 17 and fixed to the wheel 6 by means of hub bolts 18, and a plurality of rolling elements or balls 20 disposed between the outer ring 17 and the hub ring 19 in two rows. Through the hub bearing 9, torque from the stem 8 is transmitted to the wheel 6 when the clutch assembly 10 is engaged. The hub ring 19 comprises a hub ring body (not numbered) and a separate inner ring 19a fitted on the hub ring body. The balls 20 in one of the two rows are disposed between the outer ring 17 and the inner ring 19a. In order to impart a predetermined preload to the hub bearing 9, the inner ring 19a is urged axially toward the outboard end of the bearing 9 by a cotter 21 fitted in the hub ring body.

The clutch assembly 10 comprises a two-way clutch 22 mounted between the stem 8 of the constant-velocity joint 7 and the hub ring 19, and an electromagnetic clutch 23 provided adjacent to the two-way clutch 22. By selectively activating and deactivating the electromagnetic clutch 23, the two-way clutch 22 is engaged and disengaged.

Figure 3:
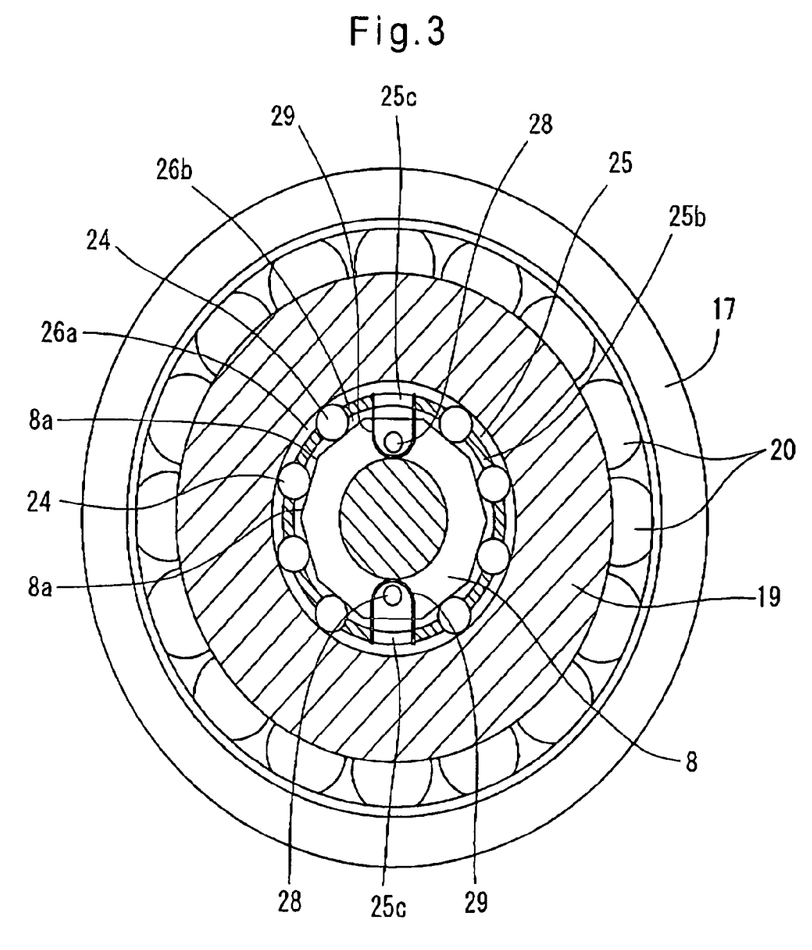
FIG. 3 is a sectional view taken along line A—A of FIG. 2.

The two-way clutch 22 comprises three rows of rollers 24 disposed between the stem 8 as a driving element and the hub ring 19 as a driven element, and a retainer 25 for retaining the rollers 24, i.e. keeping the individual rollers 24 spaced from one another. As shown in FIG. 3, the hub ring 19 of the hub bearing 9, which also serves as an outer ring of the two-way clutch 22, has a cylindrical inner surface. The stem 8, which serves as an inner member of the two-way clutch 22, has cam surfaces 8a on its outer periphery, radially opposite the cylindrical inner surface of the hub ring 19. In a space defined by the cylindrical surface of the ring 19 and each cam surface 8a, one of the rollers 24 in each tow is received. This space comprises two circumferentially arranged, wedge-shaped half portions 26a and 26b. When each roller 24 moves from the central portion of the cam surface 8a into one of the wedge-shaped spaces 26a and 26b of the space, the rollers 24 engage both the stem 8 and the hub ring 19, thus locking them together.

The retainer 25 includes a pair of side rings 25a and 25b, and is held in position so as to be concentric with the stem 8 by having the side ring 25a supported on a retainer guide 27 fitted on a small-diameter portion of the stem 8 and the side ring 25b supported on a large-diameter portion of the stem 8. The side ring 25a is formed with a pair of diametrically opposed cutouts 25c in which are received U-shaped switch springs 29 which engage pins 28 formed on the stem 8. The switch springs 29 bias the retainer 25 toward a neutral position where each roller 24 is substantially at the central portion of the cam surface 8a. Detailed structure of the retainer 25 will be described later.

Returning to FIG. 2, the electromagnetic clutch 23 comprises an electromagnet 30 received in an electromagnet holder 31 secured to the outer ring 17 of the hub bearing 9 by bolts, a rotor 32 mounted to a rotor holder 33 secured to the hub ring 19, and an armature 34 coupled to the retainer 25 so as to be axially movable but nonrotatable relative to the retainer 25 while facing the electromagnet 30 with the rotor 32 disposed therebetween. The armature 34 is biased axially away from the rotor 32 by a spring 35 disposed between the rotor 32 and the armature 34.

Figure 4A:
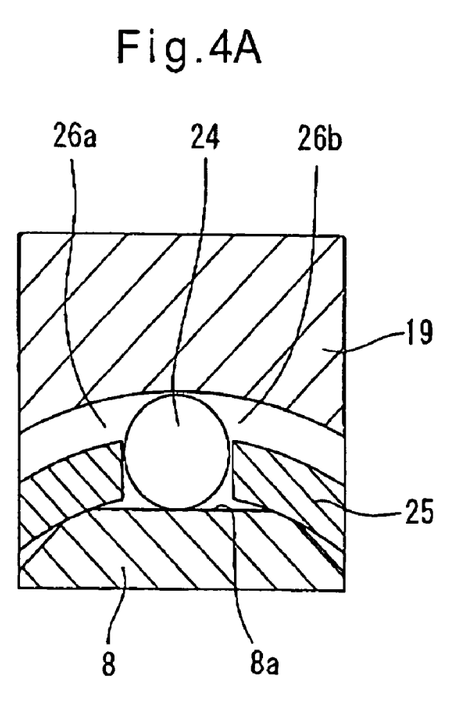
FIGS. 4A, 4B and 4C are partial cross-sectional views of a two-way clutch of a clutch assembly shown in FIG. 2, showing its different operational states.

While the electromagnet 30 of the electromagnetic clutch 23 is not activated, the rotor 32, which is mounted to the hub ring 19, and the armature 34, which is coupled to the retainer 25, are separated from each other by the spring 35. The retainer 25 is thus kept in its neutral position as shown in FIG. 4A. In this neutral position, there exists a gap between each roller 24 and the hub ring 19. That is, the clutch 22 is disengaged, so that the hub ring 19 and the stem 8 are rotatable relative to each other, and torque is not transmitted between the stem 8 and the wheel 6.

Figure 4B:
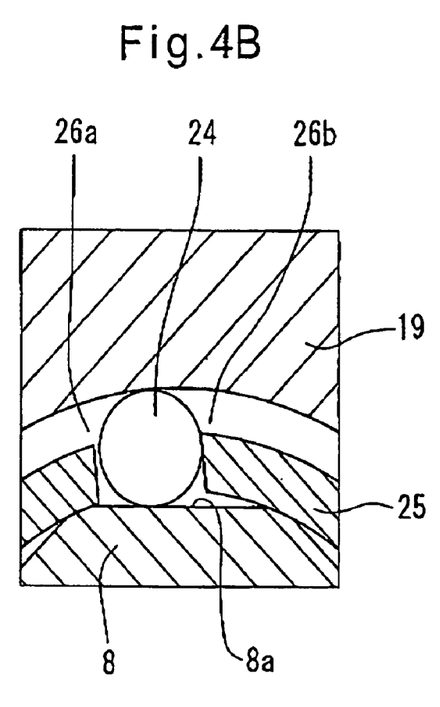
Figure 4C:
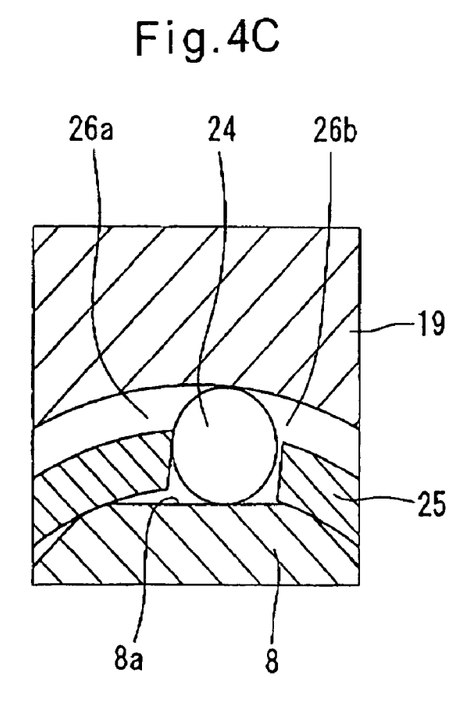

When the electromagnet 30 is energized, the armature 34 is magnetically attracted toward the electromagnet against the force of the spring 35 until the armature 34 is pressed against the rotor 32. Thus, due to the friction between the rotor 32 and the armature 34, the armature 34 and the rotor 32 are bound together so as not to be rotatable relative to each other. Any relative rotation between the hub ring 19 and the stem 8 in this state will therefore cause the retainer 25, which is now nonrotatably coupled to the hub ring 19 through the armature 34 and the rotor 32, to rotate in one direction from its neutral position relative to the stem 8. This in turn causes each roller 24 to wedge into one of the wedge-shaped spaces 26a and 26b as shown in FIGS. 4B and 4C, thus engaging the stem 8 and the hub ring 19 together. That is, the clutch 22 engages. The hub ring 19 and the stem 8 now rotate together.

The pair of clutch assemblies 10 are selectively controlled in the above-described manner independently of each other. For example, while the vehicle is turning a corner, the clutch assemblies 10 are separately controlled such that the two wheels will rotate at different speeds corresponding to the difference between the turning radii of the two wheels. This prevents a phenomenon known as tight corner braking.

As described above, the electric drive system according to the present invention includes a pair of power transmission mechanisms, each including the clutch assembly 10 and each provided between one of the wheels 6 and the power distribution mechanism 3. Thus, the clutch 22 of each clutch assembly 10 can be selectively engaged and disengaged simply by activating and deactivating the electromagnetic clutch 23. By disengaging the clutches 22 of both clutch assemblies 10, torque from either wheel can be completely shut off, so that the motor 1 can be reliably protected against overloads.

Since the hub ring 19 of each hub bearing 9 is used as the outer ring of the clutch 22 of the clutch assembly 10, and the electromagnetic clutch 23 is joined to the hub bearing 9, it is possible to reduce the overall weight of the elements driven by the stem 8, including the wheel 6. This in turn makes it possible to reduce drag torque produced when the clutch 22 of each clutch assembly 10 is disengaged. Fuel economy thus improves compared with conventional vehicles. Since the hub ring 19 is used as the outer ring of the clutch 22, and the stationary outer ring of the hub bearing 9 serves as a clutch cover, there is no need to provide a separate outer ring for the clutch 22 and a separate clutch cover. The power transmission mechanism of the present invention is thus simple in structure, compact in size and lightweight.

Since the clutch assemblies 10 serve as a conventional differential, the power distribution mechanism 3 does not have to have a differential function. It simply distributes equal driving forces to the respective drive axles and thus is simple in structure. This minimizes the weight and cost of the entire drive train.

Instead of using the hub ring 19 of the hub bearing 9 as the outer ring of the clutch 22 of the clutch assembly 10 and joining the electromagnetic clutch 23 to the hub bearing 9, the clutch assembly 10 may be provided separately from the hub bearing 9. But in this case, too, the clutch assembly 10 is preferably installed as close to the wheel as possible to minimize drag torque.

As described above, the power transmission mechanism shown has no differential function, but the power transmission mechanism according to the present invention may have this function, i.e. the function of always delivering equal torques to the two drive wheels. For example, it may be a differential gear. In such a case, it is not necessary to control the pair of clutch assemblies 10 independently of each other, so that the clutch assemblies 10 can be controlled more easily.

Because the rollers 24 of the two-way clutch 22 of each clutch assembly 10 are arranged in three rows, it is possible to reduce their diameter without reducing the maximum torque that can be transmitted through the rollers 24. Furthermore, because it is not necessary to increase the number of rollers in each row, or their length in order to increase the maximum torque that can be transmitted through the rollers 24, the clutch assemblies 10 are less likely to malfunction. The cam surfaces 8a can be formed on the stem 8 as easily as conventional such cam surfaces.

While the numbers of the rollers in the respective rows are equal to each other in the embodiment, they may be different from each other. In this case, it will be more difficult and troublesome to form the cam surfaces and assemble the clutch assemblies. But the clutch assemblies can be designed more freely so as to impart more varied properties to the clutch assemblies.

It is also possible to form the cam surfaces such that the cam surfaces in each row are angularly offset from the cam surfaces in the other rows with the numbers of the cam surfaces and thus the rollers in the respective rows kept equal to one another. In this case, it will be more difficult and troublesome to form the cam surfaces. But the rollers and the switch springs can be positioned more freely.

Also, each clutch assembly may comprise a plurality of two-way clutches each including rollers arranged in a single row, and electromagnetic clutches each for controlling one of the two-way clutches. In this arrangement, the retainer of each two-way clutch is simpler in structure. But the number of parts of each clutch assembly increases because it includes as many electromagnetic clutches as the two-way clutches and as many sets of switch springs as the two-way clutches. Thus, the clutch assemblies of the embodiment are preferable to such clutch assemblies in that the former need less installation space, are lighter in weight, more compact in size and less expensive.

Figure 5:
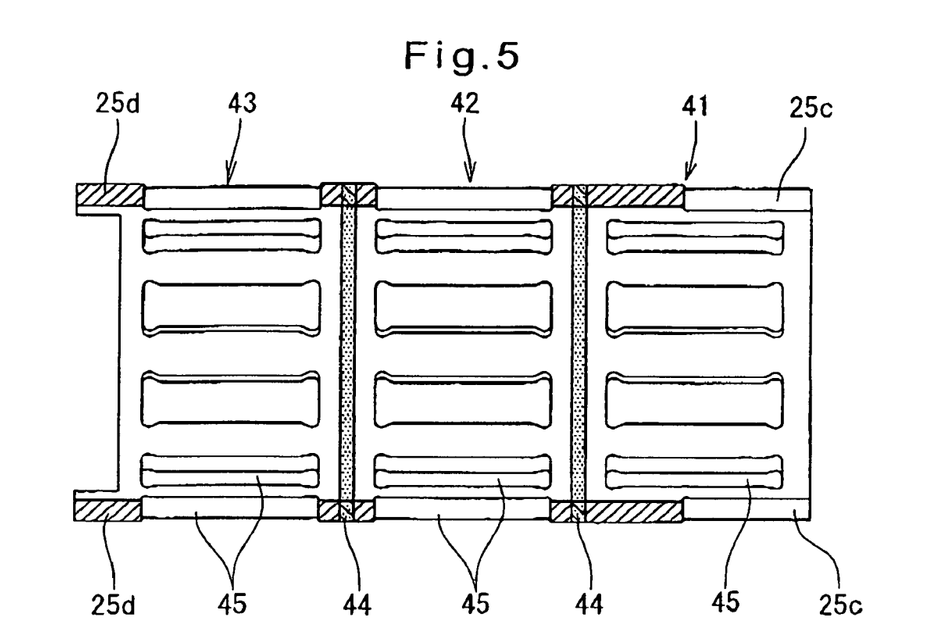
FIGS. 5, 6, 7A and 7B are front views in longitudinal section of different retainers used in the two-way clutch shown in FIG. 2.

Detailed description is now made of the retainer 25 of the two-way clutch 22 of each clutch assembly 10. As shown in FIG. 5, the retainer 25 comprises three metallic cylinders 41, 42 and 43 that are arranged coaxial with one another and joined together by elastic rubber members 44 formed by pouring a rubber material between the opposed end faces of the adjacent cylinders and vulcanizing it. Windows 45 for receiving the rollers 24 are formed in each of the cylinders 41–43 so as to axially align with the corresponding windows in the other cylinders.

As described above, the cutouts 25c for receiving the switch springs 29 are formed in the cylinder 41, which is at one end of the retainer 25, so as to be diametrically opposite to each other The cutouts 25c are formed in the cylinder 41 instead of two of the windows 45. That is, no windows are formed in the cylinder 41 at positions where the cutouts 25c are formed. The cutouts 25c eliminate the need to provide the cylinder 41 with separate mounting portions for the switch springs 29, thereby shortening the axial length of the retainer 25 and reducing its size.

The cylinder 43 at the other end of the retainer 25 is formed with two claws 25d protruding axially from its end remote from the cylinder 41 and engaged in cutouts formed in the radially inner surface of the armature 34, thereby keeping the armature 34 axially movable but nonrotatable relative to the retainer 25.

Since the cylinders 41-43 are elastically joined together through elastic members 44, which are lower in rigidity than the metallic cylinders 41-43, even if the rollers in one or two of the three rows should be left unengaged when the rollers in the other row or rows are engaged, and as a result, the retainer 25 is subjected to torsional stresses, the elastic members 44 will absorb such stresses, thereby preventing stress concentration and thus any trouble of the clutch assembly resulting from stress concentration.

Instead of forming the windows 45 after joining the cylinders 41-43 together through the elastic members 44, the windows 45 may be formed before joining the cylinders 41-43 together. But in this case, it is difficult to join the cylinders together such that the windows in the respective cylinders will accurately align with each other in the axial direction, especially due to strains during heating for vulcanization of the elastic members 44. If the windows in the respective cylinders are even slightly misaligned, it is difficult to stably engage the rollers. Also, part of the rubber forming the elastic members 44 may flow into one window or two and harden there, thereby hindering normal clutch action. Thus, for stable operation of the clutch assembly, the windows are preferably formed after joining the cylinders together.

While the elastic members 44 are a rubber member in the embodiment, they may be made of an organic compound other than a rubber such as a plastic. An anisotropic material is especially preferable because an anisotropic material shows different rigidities in different directions, so that by using elastic members 44 made of an anisotropic material, it is possible to separately determine the flexural rigidity and torsional rigidity to suitable values according to the expected amount of deflection of the hub bearing and the expected torsion amount of the stem. This further reduces the possibility of malfunction of the clutch assemblies. Such anisotropic materials include liquid crystal plastics, which shows different elastic modulus according to the flow direction during molding, and plastics or rubbers having anisotropy by mixing fibrous fillers therein.

Figure 6:
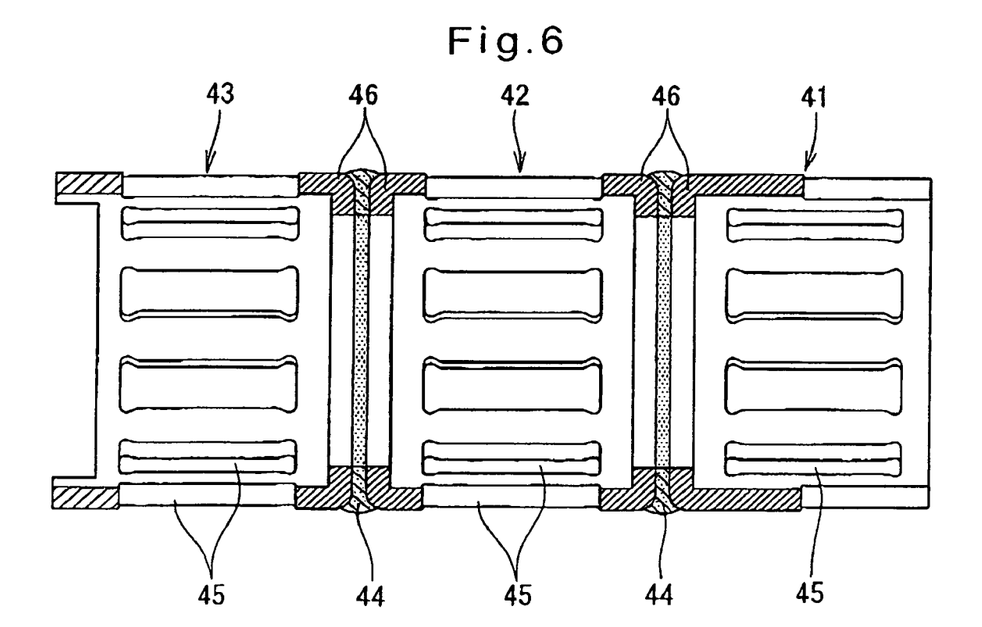

In the embodiment of FIG. 6, the cylinders 41-43 have their adjacent radially outer edges bent radially inwardly as shown at 46 and bonded to each other through elastic members 44. The bent portions 46 increase the rigidity of the individual cylinders 41-43 and also increase the bond strength between the adjacent cylinders 41-43 because the bond area between the elastic members 44 and the bent portions 46 increases. The rigidity of the entire retainer 25 thus increases.

Figure 7A:
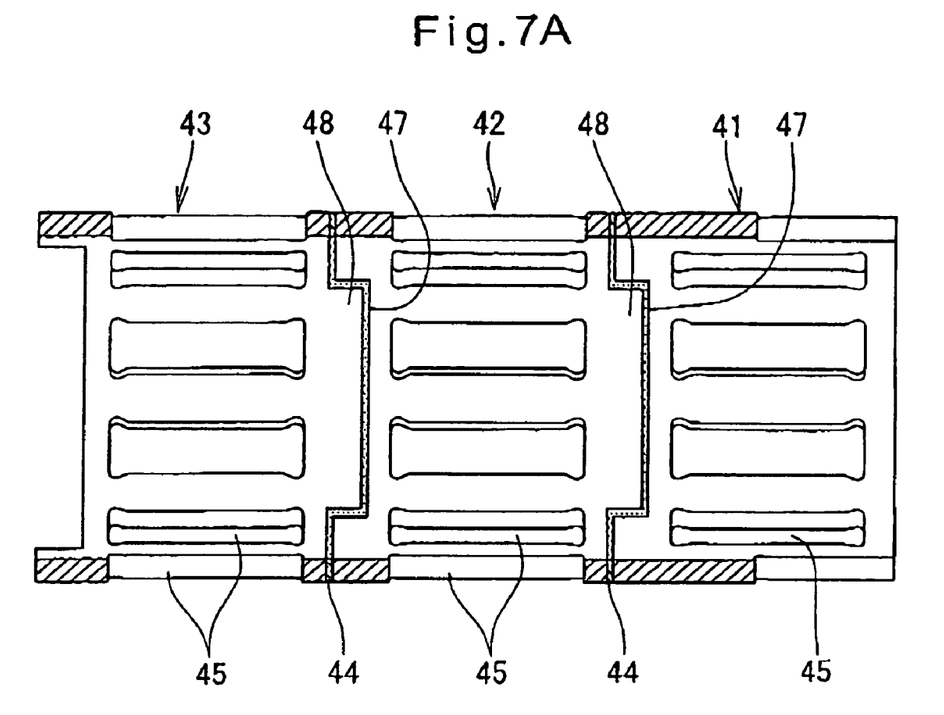

In the embodiment of FIG. 7A, along their adjacent side edges, the cylinders 41-43 have axial recesses 47 and protrusions 48 arranged circumferentially alternating with each other. The cylinders 41-43 are bonded together by engaging the protrusions 48 of the respective cylinders 41-43 engaged in the corresponding recesses 47 of the adjacent cylinders 41-43 with elastic rubber members 44 disposed therebetween. With this arrangement, the torsional rigidity of the entire retainer 25 increases. The elastic members 44 are less likely to peel off, too. The longitudinal sectional shape of the protrusions and recesses are not limited to rectangular as shown, provided the protrusions and recesses can prevent relative rotation of the cylinders by meshing with each other.

Figure 7B:
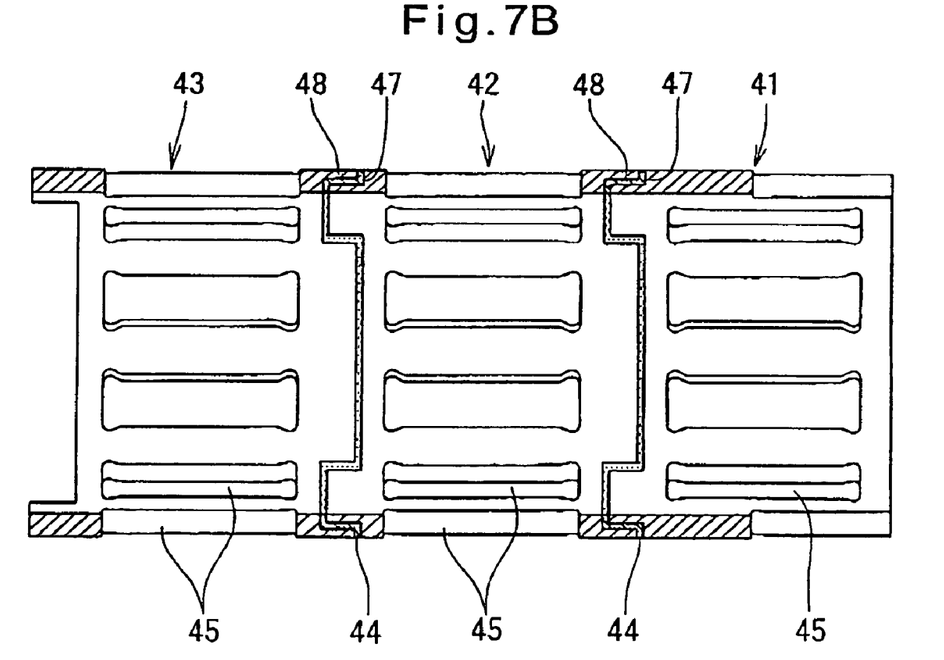

In the embodiment of FIG. 7B, the protrusions 47 and the recesses 48 are arranged so as to mesh with each other both circumferentially and diametrically. With this arrangement, the bond strength between the cylinders and the elastic members 44 and the bending rigidity of the entire retainer 25 further improve. The thicknesses of the elastic members 44 at their axial portions and at their circumferential portions determine the torsional rigidity and the bending rigidity of the retainer 25, respectively. Thus, by separately adjusting the axial gaps and circumferential gaps between the protrusions and recesses and thus the thicknesses of the elastic members 44 at their portions filling the respective gaps, the torsional rigidity and the bending rigidity of the retainer 25 can be determined separately from each other as in the embodiment in which the elastic members are made of an anisotropic material.

In the embodiments, the cylinders are metallic, but they may be made of a plastic to reduce the material cost. In this case, the elastic members have to be lower in rigidity than the plastic forming the cylinders.

In the embodiments, the retainer comprises three separate cylinders. But it may comprise a single, one-piece cylinder formed with windows in three rows. Since such a single, one-piece cylinder is longer than each of the three cylinders that are joined together to form the retainer, the former is likely to be subjected to greater bending and torsional stresses than the latter. Thus, it is important to take this fact into consideration in selecting the material, thickness, etc. of such a single, one-piece cylinder.

The power transmission mechanism of the present invention can be used not only in a drive train of an electric motor-driven vehicle but also in a drive train of an engine-driven vehicle.

What is claimed is:

1. A power transmission mechanism for a vehicle including a clutch assembly comprising:

a two-way clutch comprising a driving member adapted to be coupled to a drive axle of the vehicle, a driven member adapted to be fixed to a wheel of the vehicle, a plurality of rows of rollers disposed between said driving member and said driven member, and a retainer disposed between said driving member and said driven member for retaining said rollers, said rollers being capable of engaging both of said driving member and said driven member when said retainer rotates in either rotational direction relative to said driving member; and an electromagnetic clutch comprising an electromagnet which can be selectively energized and deenergized, and a rotor coupled to said driven member and adapted to be nonrotatably coupled to said retainer when said electromagnet is energized or deenergized, whereby driving torque can be transmitted from the drive axle to the wheel through said two-way clutch by energizing or deenergizing said electromagnet;

wherein said retainer comprises a plurality of retainer elements each retaining one of said plurality of rows of rollers, said retainer elements being joined together through an elastic member having a lower rigidity than said retainer elements.

2. The power transmission mechanism of claim 1 wherein said retainer elements are made of a metal and said elastic member is made of an organic compound.

3. The power transmission mechanism of claim 2 wherein said retainer elements have side edges facing each other, said side edges being bent radially inwardly and bonded to each other through said elastic member.

4. The power transmission mechanism of claim 2 wherein said retainer elements have side edges facing each other, and wherein protrusions and recesses are formed along each of said side edges, said protrusions formed along each of said side edges being engaged in said recesses formed along the opposed side edge, with said elastic member filling a gap present between said side edges.

5. The power transmission mechanism of claim 2 wherein said elastic member is made of an anisotropic material, whereby the bending rigidity and the torsional rigidity of said retainer can be determined separately from each other.

6. The power transmission mechanism of claim 2 wherein said retainer elements have windows each receiving one of said rollers, said windows being formed after joining said retainer elements together.

7. An electric drive system for a vehicle, comprising an electric motor, a pair of wheels, and a drive train for transmitting driving torque produced by said electric motor to said wheels, said drive train comprising a speed reducer connected to said electric motor, a power distribution mechanism connected to said speed reducer, drive axles connected to said power distribution mechanism, two power transmission mechanisms each according to claim 2, each power transmission mechanism being coupled to one of said drive axles, and hub bearings each connected to one of said drive axles through one of said power transmission mechanisms and coupled to one of said wheels.

8. The power transmission mechanism of claim 1 wherein said retainer elements are made of a plastic.

9. The power transmission mechanism of claim 8 wherein said retainer elements have side edges facing each other, said side edges being bent radially inwardly and bonded to each other through said elastic member.

10. The power transmission mechanism of claim 8 wherein said retainer elements have side edges facing each other, and wherein protrusions and recesses are formed along each of said side edges, said protrusions formed along each of said side edges being engaged in said recesses formed along the opposed side edge, with said elastic member filling a gap present between said side edges.

11. The power transmission mechanism of claim 8 wherein said elastic member is made of an anisotropic material, whereby the bending rigidity and the torsional rigidity of said retainer can be determined separately from each other.

12. The power transmission mechanism of claim 8 wherein said retainer elements have windows each receiving one of said rollers, said windows being formed after joining said retainer elements together.

13. An electric drive system for a vehicle, comprising an electric motor, a pair of wheels, and a drive train for transmitting driving torque produced by said electric motor to said wheels, said drive train comprising a speed reducer connected to said electric motor, a power distribution mechanism connected to said speed reducer, drive axles connected to said power distribution mechanism, two power transmission mechanisms each according to claim 8, each power transmission mechanism being coupled to one of said drive axles, and hub bearings each connected to one of said drive axles through one of said power transmission mechanisms and coupled to one of said wheels.

14. The power transmission mechanism of claim 1 wherein said retainer elements have side edges facing each other, said side edges being bent radially inwardly and bonded to each other through said elastic member.

15. The power transmission mechanism of claim 14 wherein said elastic member is made of an anisotropic material, whereby the bending rigidity and the torsional rigidity of said retainer can be determined separately from each other.

16. The power transmission mechanism of claim 14 wherein said retainer elements have windows each receiving one of said rollers, said windows being formed after joining said retainer elements together.

17. An electric drive system for a vehicle, comprising an electric motor, a pair of wheels, and a drive train for transmitting driving torque produced by said electric motor to said wheels, said drive train comprising a speed reducer connected to said electric motor, a power distribution mechanism connected to said speed reducer, drive axles connected to said power distribution mechanism, two power transmission mechanisms each according to claim 14, each power transmission mechanism being coupled to one of said drive axles, and hub bearings each connected to one of said drive axles through one of said power transmission mechanisms and coupled to one of said wheels.

18. The power transmission mechanism of claim 1 wherein said retainer elements have side edges facing each other, and wherein protrusions and recesses are formed along each of said side edges, said protrusions formed along each of said side edges being engaged in said recesses formed along the opposed side edge, with said elastic member filling a gap present between said side edges.

19. The power transmission mechanism of claim 18 wherein said gap has axial portions defined by axial walls of said protrusions and said recesses and circumferential portions defined by circumferential walls of said protrusions and said recesses, whereby the bending rigidity and the torsional rigidity of said retainer can be determined separately from each other by separately adjusting the widths of said axial portions and said circumferential portions of said gap and thereby separately adjusting the thicknesses of the portions of said elastic member filling said axial portions and said circumferential portions of said gap.

20. The power transmission mechanism of claim 19 wherein said retainer elements have windows each receiving one of said rollers, said windows being formed after joining said retainer elements together.

21. An electric drive system for a vehicle, comprising an electric motor, a pair of wheels, and a drive train for transmitting driving torque produced by said electric motor to said wheels, said drive train comprising a speed reducer connected to said electric motor, a power distribution mechanism connected to said speed reducer, drive axles connected to said power distribution mechanism, two power transmission mechanisms each according to claim 19, each power transmission mechanism being coupled to one of said drive axles, and hub bearings each connected to one of said drive axles through one of said power transmission mechanisms and coupled to one of said wheels.

22. The power transmission mechanism of claim 18 wherein said elastic member is made of an anisotropic material, whereby the bending rigidity and the torsional rigidity of said retainer can be determined separately from each other.

23. The power transmission mechanism of claim 18 wherein said retainer elements have windows each receiving one of said rollers, said windows being formed after joining said retainer elements together.

24. An electric drive system for a vehicle, comprising an electric motor, a pair of wheels, and a drive train for transmitting driving torque produced by said electric motor to said wheels, said drive train comprising a speed reducer connected to said electric motor, a power distribution mechanism connected to said speed reducer, drive axles connected to said power distribution mechanism, two power transmission mechanisms each according to claim 18, each power transmission mechanism being coupled to one of said drive axles, and hub bearings each connected to one of said drive axles through one of said power transmission mechanisms and coupled to one of said wheels.

25. The power transmission mechanism of claim 1 wherein said elastic member is made of an anisotropic material, whereby the bending rigidity and the torsional rigidity of said retainer can be determined separately from each other.

26. The power transmission mechanism of claim 25 wherein said retainer elements have windows each receiving one of said rollers, said windows being formed after joining said retainer elements together.

27. An electric drive system for a vehicle, comprising an electric motor, a pair of wheels, and a drive train for transmitting driving torque produced by said electric motor to said wheels, said drive train comprising a speed reducer connected to said electric motor, a power distribution mechanism connected to said speed reducer, drive axles connected to said power distribution mechanism, two power transmission mechanisms each according to claim 25, each power transmission mechanism being coupled to one of said drive axles, and hub bearings each connected to one of said drive axles through one of said power transmission mechanisms and coupled to one of said wheels.

28. The power transmission mechanism of claim 1 wherein said retainer elements have windows each receiving one of said rollers, said windows being formed after joining said retainer elements together.

29. An electric drive system for a vehicle, comprising an electric motor, a pair of wheels, and a drive train for transmitting driving torque produced by said electric motor to said wheels, said drive train comprising a speed reducer connected to said electric motor, a power distribution mechanism connected to said speed reducer, drive axles connected to said power distribution mechanism, two power transmission mechanisms each according to claim 28, each power transmission mechanism being coupled to one of said drive axles, and hub bearings each connected to one of said drive axles through one of said power transmission mechanisms and coupled to one of said wheels.

30. An electric drive system for a vehicle, comprising an electric motor, a pair of wheels, and a drive train for transmitting driving torque produced by said electric motor to said wheels, said drive train comprising a speed reducer connected to said electric motor, a power distribution mechanism connected to said speed reducer, drive axles connected to said power distribution mechanism, two power transmission mechanisms each according to claim 1, each power transmission mechanism being coupled to one of said drive axles, and hub bearings each connected to one of said drive axles through one of said power transmission mechanisms and coupled to one of said wheels.

31. The electric drive system of claim 30 wherein said power distribution mechanism has a function of rotating said drive axles at the same speed.

32. The electric drive system of claim 31 wherein said clutch assembly of each of said power transmission mechanisms is integral with said corresponding hub bearing.

33. The electric drive system of claim 30 wherein said power distribution mechanism has a function of delivering equal driving torques to said drive axles.

34. The electric drive system of claim 33 wherein said clutch assembly of each of said power transmission mechanisms is integral with said corresponding hub bearing.

35. The electric drive system of claim 30 wherein said clutch assembly of each of said power transmission mechanisms is integral with said corresponding hub bearing.

* * * * *